Oct. 26, 1965 J. M. HEYNING ETAL 3,214,602

MULTIVIBRATOR PULSE GENERATOR

Filed Dec. 7, 1959 2 Sheets-Sheet 1

INVENTORS.
JOAN M. HEYNING
BILL MOULDS

BY Fraser and Bogucki

ATTORNEYS

INVENTORS.
JOAN M. HEYNING
BILL MOULDS
BY Fraser and Bogucki
ATTORNEYS

United States Patent Office
3,214,602
Patented Oct. 26, 1965

3,214,602
MULTIVIBRATOR PULSE GENERATOR

Joan M. Heyning, Torrance, and Bill Moulds, Los Gatos, Calif., assignors to International Business Machines Corporation, New York, N.Y., a corporation of New York Filed Dec. 7, 1959, Ser. No. 857,797
12 Claims. (Cl. 307—88.5)

This invention relates to pulse generating circuits and more particularly to a new and improved monostable multivibrator circuit which may be controlled to provide an output signal having a time duration which can be varied precisely within widely separated limits.

Multivibrators, sometimes called trigger circuits, are extensively employed in radar systems, electronic computers, and data processing systems. Multivibrators which are bistable can be set into either of two stable states to perform a variety of binary functions. Monostable multivibrators, also known as single-shot or one-shot multivibrators, provide a single timed cycle of operation when actuated. The monostable multivibrator is usually used to provide a precisely timed and shaped rectangular output pulse.

In multivibrator circuits, a pair of electronic devices such as electron tubes or transistors are cross-connected in a manner which provides the desired stable states of operation. The cross-connection is symmetrical in bistable multivibrators, but asymmetrical in monostable multivibrators. In contrast to the bistable multivibrator, a monostable multivibrator has only one stable state, and a transistory, triggered, state of operation. In the stable state of operation, the two electronic devices of the monostable multivibrator have differing conductivity conditions. When the multivibrator is triggered, these differing conductivity conditions are reversed for a time period which is determined by the time constants established by the circuit elements employed in the cross-connections between the electronic devices. Following the triggered time period, the stable state is again assumed. Thus, an output signal is provided in the form of a pulse having a time duration corresponding to the period of the unstable condition.

In many instances it is desirable that the time duration of the pulses provided by a multivibrator be controllable within widely separated limits so that the circuit may be employed in servo or other automatic control systems with the time duration of the output pulses being continuously varied with operating conditions.

Circuits which have previously been developed for control of the time duration, i.e., width, of the output pulse of a multivibrator, however, have suffered from one or more of a number of deficiencies. It has been particularly difficult to provide precise control of the pulse width over a wide range. Where this objective has been accomplished, the result has been achieved only with relatively expensive and complex circuitry. Furthermore, variation of the pulse width has required adjustment of more than one of the circuit elements. Also, the circuit parameters of the multivibrator are often affected by the variation of pulse width, and there is a consequent decrease in the reliability of operation of the multivibrator itself. For example, under such conditions the multivibrator may be affected by the amplitude of the trigger pulse. It would also be useful to have an added capability, through which the pulse might selectively be terminated by a separate signal. Thus, the circuit would provide pulses of selected width, or pulses of lesser width which terminate in synchronism with signals from an external source.

It is therefore an object of the present invention to provide a new and improved form of pulse generator.

It is another object of the present invention to provide an improved multivibrator circuit for providing an output signal which is controllably variable in time duration between widely separated limits.

A further object of this invention is to provide an improved monostable transistor multivibrator circuit which may readily be adjusted to provide output pulses of controllable widths without affecting the reliability of the multivibrator circuit under varying conditions.

It is still another object of this invention to provide an improved monostable multivibrator circuit which can provide output pulses which are adjustable and which may be terminated selectively in response to independently applied pulses.

These and other objects of the present invention are achieved by an arrangement in accordance with the invention which employs a feedback circuit coupled between the output terminal and the input terminal of a multivibrator. The feedback circuit may consist of a differentiator and a signal isolating device which are so interrelated that variation of a single adjustable circuit element has a dual cumulative effect on the duration of operation of the signal isolating device. The signal isolating device in turn governs the potential of the input terminal of the multivibrator so as to control the state thereof.

In a particular form of device according to the invention, a timing control circuit may be used as the feedback circuit between the output and input terminals of a monostable multivibrator. A normally non-conducting emitter follower transistor may be reverse biased, the level of the reverse bias being determined by the setting of a variable resistor coupled to the base of the emitter follower transistor. The emitter of the emitter follower transistor may be coupled to the input circuit of the multivibrator, to isolate the multivibrator from the feedback path except for signals passed by the timing control circuit. The feedback circuit may be completed by a capacitor coupled to both the variable resistor and the emitter follower transistor, the capacitor forming a differentiating circuit with the adjustable resisor and the time constant of the differentiating circuit also being dependent on the setting of the variable resistor. Upon the actuation of the multivibrator, the leading edge of the output pulse initiates a differentiated signal which overcomes the reverse bias on the emitter follower transistor. The two factors which determine the length of time during which the emitter follower transistor is forward biased and thus conducting are arranged to have a cumulative effect. Thus, relatively minor variations in the setting of the variable resistor produce wide variations in the operation of the timing control circuit. When the emitter follower transistor ceases to conduct, the potential of the input circuit of the multivibrator is shifted to a different level which causes the multivibrator to revert to the stable operating state, thus terminating the output pulse at a controlled time.

In accordance with further features of this invention, an arrangement may be provided in which the time duration of output pulses from a multivibrator may be precisely varied and terminated by synchronizing pulses. In this arrangement, the synchronizing pulses may be injected into the timing control circuit, to terminate conduction of the emitter follower transistor so as to end the multivibrator output pulse.

The novel features of the invention, as well as the invention itself, may be better understood by reference to the following description, taken in conjunction with the accompanying drawing, in which.

Figure 1:
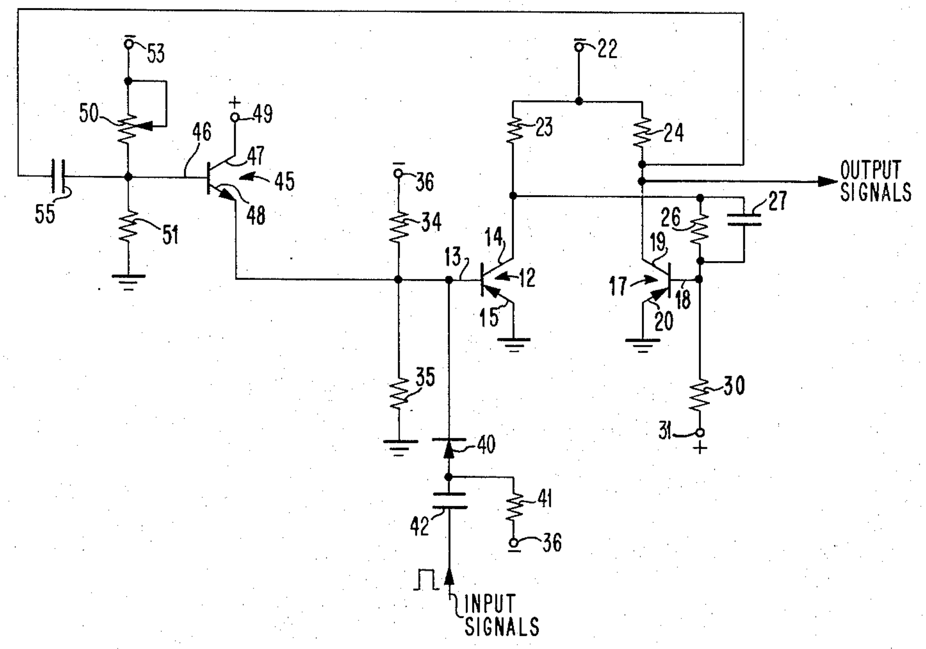
FIG. 1 is a schematic circuit diagram of one arrangement in accordance with the invention.

An arrangement by which output pulses of precisely controlled time duration or width may be provided is illustrated in FIG. 1. A monostable multivibrator includes a first multivibrator transistor 12 and a second multivibrator transistor 17. The transistor devices 12 and 17 exemplify electronic devices which may be used as the active circuit elements in a multivibrator. The multivibrator transistors 12 and 17 which are illustrated are of the P–N–P conductivity type, and have bases 13, 18, collectors 14, 19, and emitters 15, 20, respectively, disposed in conventional fashion. The emitters 15, 20 of the first and second multivibrator transistors 12 and 17, respectively, are each coupled to ground. The collectors 14 and 19 are coupled through separate load resistors 23 and 24 to a source of negative potential 22.

In accordance with the multivibrator design considerations set forth above, the transistors 12 and 17 comprise two active elements 12 and 17 which are cross-connected by passive circuit elements to provide a monostable multivibrator. The cross-connection of the elements comprises a shunt arrangement of a resistor 26 and a capacitor 27 which is coupled between the collector 14 of the first multivibrator transistor 12 and the base 18 of the second multivibrator transistor 17. The capacitor 27 functions to bypass the resistor 26 during the transient period when switching takes place so as to produce a fast switching action between the transistors 12 and 17.

The bias arrangement of the first and second multivibrator transistors 12 and 17 is such that the first multivibrator transistor 12 is maintained normally conducting while the second multivibrator transistor 17 is maintained normally non-conducting. To this end, the base 18 of the second multivibrator transistor 17 is coupled to the midpoint of a voltage divider pair of resistors formed by the resistor 26 and an additional resistor 30 coupled to a source of positive potential 31. This arrangement in the normal condition of operation maintains the base 18 of the second multivibrator transistor 17 under a reverse bias relative to the emitter 20 potential and holds the non-conducting state. The terms "normally conducting" and "normally non-conducting," as used herein, are employed primarily to designate circuit conditions during the stable or steady state of operation of the multivibrator.

In conjunction with the biasing of the second multivibrator transistor 17, the potential of the first multivibrator transistor base 13 is maintained only slightly below ground by a coupling from a circuit junction between a pair of resistors 34, 35 to the base 13. The end of the resistor 34 opposite the circuit junction is coupled to a source of negative potential 36, while the opposite end of the other resistor 35 is coupled to ground. This arrangement insures that the first multivibrator transistor 12 will normally be fully conducting.

The input circuit for the monostable multivibrator includes the base 13 of the first multivibrator transistor 12 and an isolating diode 40 coupled to the base 13 and poled so as to pass positive pulses from an external source to the base 13. The isolating diode 40 is reverse biased by a resistor 41 which is coupled to the source of negative potential 36, and input signals are applied to the isolating diode 40 through a coupling capacitor 42. The output circuit for the multivibrator is defined by an output terminal at the collector 19 of the second multivibrator transistor 17, from which output signals are taken.

A timing control circuit is employed with the multivibrator to define a feedback path extending from the output circuit of the multivibrator back to the input circuit. The timing control circuit includes an N–P–N type emitter follower transistor 45 having a base 46, a collector 47 and an emitter 48. The emitter 48 of the emitter follower transistor 45 is coupled to the input circuit of the multivibrator and the collector 47 is coupled to a source of positive potential 49. The base 46 is coupled to a circuit junction point between a pair of resistors 50, 51. A first of the pair of resistors is a variable resistance device 50 which is connected to a source of negative potential 53, while the other resistor 51 couples the junction point to ground. This arrangement of resistors 50, 51 and the negative source 53 applies a reverse bias to the base 46 so that the emitter follower transistor 45 is normally non-conducting. The control circuit feedback path is completed by a capacitor 55 which couples the output circuit of the multivibrator to the junction point between the variable resistor 50 and the base 46 of the emitter follower transistor 45. The capacitor 55, the resistor 51 and the variable resistor 50 form a differentiating circuit which is responsive to output pulses from the multivibrator. Note that the time constant, and thus the decay characteristics, of a signal passing through the differentiating circuit, and also the level at which the emitter follower transistors 45 is reverse biased, are both determined by the setting of the variable resistor 50.

In the operation of the arrangement of FIG. 1, the monostable multivibrator functions to maintain a stable state in which the first multivibrator transistor 12 is conducting and the second multivibrator transistor 17 is non-conducting, except when the multivibrator receives a trigger signal to place it in the unstable or triggered state for a controlled period of time. A positive input pulse applied to the base 13 of the first multivibrator transistor 12 through the isolating diode 40 decreases the forward bias of the normally fully conducting first multivibrator transistor 12. Consequently, there is a decrease in the base 13 and collector 14 current, and the potential level of the collector 14 becomes more negative. This action continues until the voltage of the base 13 with respect to the emitter 15 of the first multivibrator transistor 12 becomes so positive that the first multivibrator transistor 12 is reverse biased and cut off.

At the same time, the decreasing potential of the collector 14 of the first multivibrator transistor 12 is applied to the base 18 of the second multivibrator transistor 17 through the resistor 26. The increased negative potential at the base 18 of the second multivibrator transistor 17 increases the forward bias of that transistor until it is fully conducting.

The timing control circuit is initiated by a triggering pulse and operates to maintain the multivibrator in a condition in which the width of the output pulse is determined by the setting of the variable resistor 50. The leading edge of an output pulse from the multivibrator is applied to the elements 50, 51, 55 of the differentiating circuit, to provide a wave having an exponential decay to the base 46 of the emitter follower transistor 45. The peak portion of the differentiated pulse overcomes the reverse bias of the emitter follower transistor 45, and renders the emitter follower transistor 45 conducting. Upon conduction of the transistor 45, a potential is applied to the base 13 of the first multivibrator transistor 12 which maintains the reverse bias on the first multivibrator transistor 12. Thus, the unstable or triggered condition of the multivibrator is maintained so long as the transistor 45 remains conducting.

An important feature should here be noted as to the arrangement of the differentiating circuit relative to the reverse bias on the emitter follower transistor 45. This feature may be better understood by reference to the representative waveforms A and B of FIG. 2. Waveform A shows the changes in potential level at the junction point of the elements 50, 51, 55 of the differentiating circuit and the base 46 of the emitter follower transistor 45. Two curves are shown, one in solid and one in dotted lines, and it will be understood that where the curves are closely parallel they are actually superimposed. For easy comparison the two curves have been drawn starting from a common reference voltage level equal to the voltage level normally established at the junction point of the elements 50, 51 and 55 by the selected setting of the variable resistor 50. It should be noted that since the reverse bias level is the voltage difference between the bias voltages applied to the emitter and base terminals 48, 46 respectively and the emitter bias voltage remains fixed, the superimposed reference voltages illustrated in waveform A would not be at equal levels if the curves were plotted with respect to a ground potential reference. Accordingly, if the two curves were plotted relative to a ground potential reference level, the horizontal lines labeled as the reverse bias levels I and II would coincide while the decay curve I along with its reference voltage level would be shifted downward with respect to decay curve II and its reference voltage level. As the waveforms of the differentiated signals illustrate, for a first assumed setting of the variable resistor 50 of FIG. 1, there is a certain reverse bias level I and a certain exponential decay curve I. For this condition, the reverse bias on the emitter follower transistor 45 is overcome for only a relatively short time, and the output pulse I (shown in waveform B) provided at the output of the multivibrator is correspondingly short.

Figure 2:
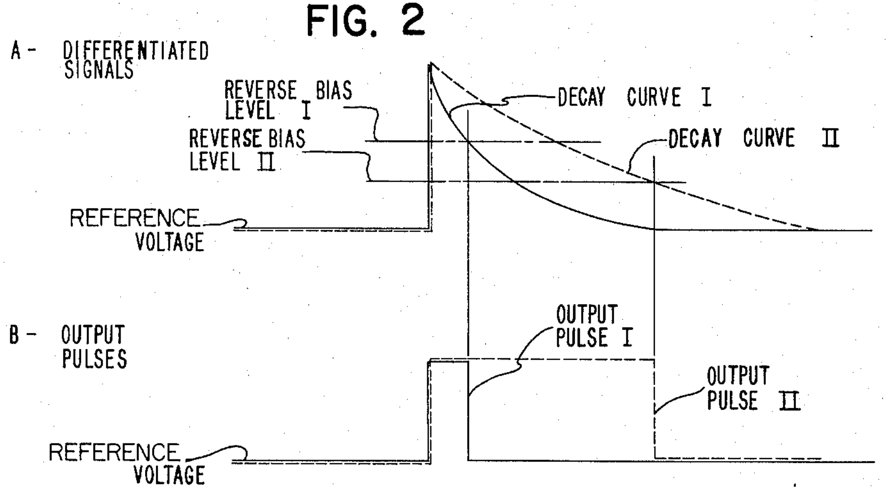
FIG. 2 is a representation of illustrative waveforms occurring at selected points in the arrangement of FIG. 1 during operation under differing conditions.

When the value of the variable resistor 50 is changed to a second typical setting, however, the value of the reverse bias level II and the exponential decay characteristic II both are changed. As illustrated at waveform A in FIG. 2, the change of both these characteristics becomes cumulative because both tend to increase the width of the output pulse. As a consequence, the resultant output pulse II as illustrated in waveform B of FIG. 2 is increased although the change in the setting of the variable resistor 50 may be relatively slight.

For this reason, simple and relatively small adjustments in the setting of the adjustable resistor 50 in the differentiating circuit have a marked but precise effect upon the width of the output pulses from the multivibrator. Additionally, it should be noted that the high input impedance of the emitter follower transistor 45 serves in very effective fashion to isolate the operation of the timing control circuit from the remainder of the multivibrator. In practice, the width of the pulse can be varied within very wide limits. Thus, where the time duration of pulses in accordance with the circuits of the prior art have been varied in excess of a ratio of 10–1 only with difficulty, circuits in accordance with the present invention permit variations of over 500–1. Furthermore, the isolation of the adjustment control from the operation of the multivibrator permits wide variations in the voltages required for the triggering input signal. Systems constructed in accordance with FIG. 1, for example, operate reliably despite variations in input signals between one and six volts. It will also be recognized by those skilled in the art that the values may be changed so as to afford a change in the range in which timing adjustments may be effected.

Figure 3:
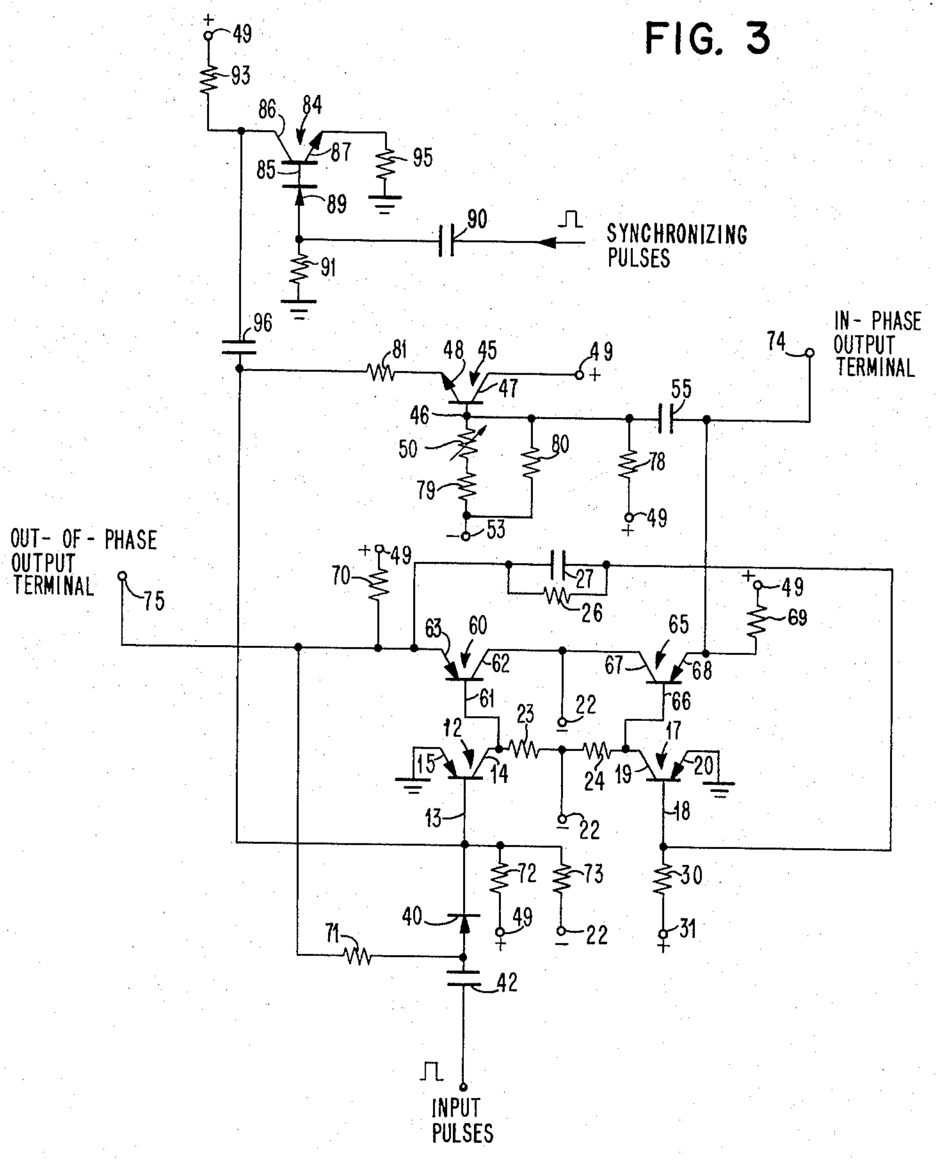
FIG. 3 is a schematic diagram of an alternative arrangement in accordance with the invention.

The arrangement of FIG. 3, to which reference is now made, provides another example of a multivibrator including an improved timing control circuit in accordance with the invention. The arrangement of FIG. 3 again functions as a monostable multivibrator. Where feasible or convenient, elements performing similar functions to those of FIG. 1 have been given like designations.

Thus, as in FIG. 1, first and second multivibrator transistors 12 and 17, respectively, are cross-coupled. Input pulses are provided through an isolating diode 40, and an asymmetrically disposed passive network comprising the resistor 26 and capacitor 27 is included in the coupling from the collector 14 of the first transistor multivibrator 12 to the base 18 of the second transistor multivibrator 17. A different biasing arrangement is, however, employed, and in this conjunction first and second emitter followers 60 and 65, respectively, are used to achieve greater stability and signal driving capability. The first and second emitter follower transistor 60 and 65, respectively, each has a base 61, 66 which is coupled to the collector 14, 19 of the associated first or second multivibrator transistor 12, 17, respectively. Each of the first and second emitter follower transistors 60, 65 is of the P–N–P conductivity type, and has its collector 62 or 67 coupled to the source of negative potential 22. The emitter 63 of the first emitter follower transistor 60 is coupled to the resistor 26 and the capacitor 27 and provides one output from the system. The other output from the system is taken from the emitter 68 of the second emitter follower transistor 65.

The arrangement which is used provides stability, but need not necessarily operate the first and second multivibrator transistors 12 and 17 with one conducting and the other cut off. Instead, with this arrangement, the transistors 12 and 17 may be operated at different levels of conduction and both may continuously conduct to some degree regardless of the state of the multivibrator. For this purpose a resistor 69 couples the emitter 68 of the second emitter follower transistor 65 to the source of positive potential 49. Another resistor 70 couples the emitter 63 of the first emitter follower transistor 60 to the source of positive potential 49. A resistor 71 also couples the emitter circuit of the first emitter follower 60 to the isolating diode 40 at the input to maintain a selected forward bias. The multivibrator circuit is maintained in the stable condition, with the first multivibrator transistor 12 conducting more heavily than the second multivibrator transistor 17, by a coupling from the base 13 of the first multivibrator transistor 12 to the center junction of a voltage divider. A first resistor 72 of the voltage divider is coupled to the source of positive potential 49 and the other resistor 73 is coupled to the source of negative potential 22.

With this arrangement, an output terminal 74 coupled to the emitter 68 of the second emitter follower transistor 65 may be termed an in-phase output terminal 74. Similarly, the output terminal 75 coupled to the emitter 63 of the first emitter follower transistor 60 may be termed the out-of-phase output terminal, and provides a waveform which is complementary to that at the in-phase output terminal 74.

A timing control circuit is employed in this arrangement which is similar to that of the timing control of FIG. 1 but which is compatible with the particular circuit relationships employed herein. The control feedback loop defined by the timing control circuit includes a differentiating circuit comprised of a capacitor 55, the resistors 78, 79, 80 and variable resistor 50 coupled to the base 46 of an emitter follower transistor 45 of the N–P–N type. A biasing arrangement to maintain a reverse bias on the transistor 45 includes a resistor 78 coupling the junction point in the differentiating circuit to the source of positive potential 49, and a resistor 79 in series with the variable resistor 50 and is shunted by a resistor 80, A resistor 81 in series with the emitter 48 is used in a differentiating circuit as described below.

The arrangement thus far described achieves control of the width of the output pulses from the multivibrator in a fashion closely analogous to the arrangement of FIG. 1. The leading edge of triggered pulses at the in-phase output terminal 74 is differentiated by the differentiating circuit and causes the emitter follower transistor 45 to apply a potential to the base 13 of the first multivibrator transistor 12 for a period which is determined by the setting of the variable resistor 50. Again, the combined relationship of the reverse bias and the decay characteristic of the differentiating circuit, both of which are established by the variable resistor 50, unite to provide a cumulative variation in the duration for which the emitter follower transistor 45 conducts. As in FIG. 1, the shift in the potential level of the input circuit of the multivibrator exercises a control over the state in which the multivibrator is operated so that the multivibrator is in a triggered or unstable state for a definite period of time, and then the stable state is restored. Note that on the termination of the triggered state the cross-coupling circuit path including the resistor 26 and capacitor 27 operates in a positive fashion to cause a reversal of the state of conduction of the second multivibrator transistor 17.

With the circuits disposed as described, synchronizing pulses may be injected into the control feedback path so as to cause the multivibrator to revert to the stable state at a time determined by a preselected synchronizing pulse. In FIG. 3, the positive synchronizing pulses are applied to a synchronization control transistor 84 of the N–P–N type. The transistor 84 is forward biased, and the synchronizing signals are applied to its base 85 through an isolating diode 89 and a network consisting of a capacitor 90 and a resistor 91. The forward bias is achieved through the use of a load resistor 93 coupling the collector 86 to the source of positive potential 49, and a resistor 95 coupling the emitter 87 to ground. Output signals from the synchronization control transistor 84 are applied through a coupling capacitor 96 to the input circuit of the multivibrator.

Even though signals in the control circuit would otherwise maintain the multivibrator in the triggered state for a predetermined period as described above, a synchronizing pulse acts to terminate the triggered state. Application of the positive going synchronizing pulse to the base 85 of the synchronization control transistor 84 causes that transistor to conduct more heavily and to provide a negative going waveform edge to the input circuit of the multivibrator. This negative going edge is differentiated by the capacitor 96 and resistor 81 combination and drops the potential level of the input circuit of the multivibrator so as to return the first multivibrator transistor 12 to the fully conducting condition. The negative going pulse effectively cancels the shift in potential level at the input circuit and causes a negative pulsing of the differentiating circuit elements 50, 55 so as to render the emitter follower transistor 45 to be once again cut off.

The arrangement of FIG. 3 is versatile in operation and capable of being used in many applications. It may be employed for control purposes, for example, where a servo system converts sequentially received pulses to voltage levels for governing a positioning device. For large deviations of the positioning device from a desired position, the pulses may be of a sufficient width, as determined by the setting of the variable resistor 50, to provide a rapid correction. As the correction by the servo system takes effect, however, the width of the output pulses may be narrowed by the application of synchronizing pulses, and the error signal accordingly diminished. In another application, successive synchronization pulses may be used with this arrangement to provide a gating pulse which occurs both at the right time and in the right width for use in a data processing system. The first synchronizing pulse to be received may thus be used as the input pulse to trigger the multivibrator, and the next may be applied to the synchronizing pulse input, so that a timed clock pulse is thus defined.

While there have been described above and illustrated in the drawings various forms of pulse generators for providing pulses whose widths may be precisely controlled within wide limits, it will be appreciated that the invention is not limited thereto. Accordingly, the invention should be considered to include any and all modifications, variations or equivalent arrangements falling within the scope of the annexed claims.

What is claimed is:

1. A timing circuit for controlling the duration of output pulses from a multivibrator which has an input circuit at which trigger signals are applied to change the multivibrator from a steady state condition and thus to generate output pulses, the timing circuit including in combination a resistance-capacitance circuit having a variable resistance and responsive to the output pulses from the multivibrator for providing differentiated signals therefrom, and a control circuit coupled to the resistance-capacitance circuit and to the input circuit of the multivibrator for shifting the input circuit potential to reestablish the initial steady state condition of the multivibrator, the control circuit being variably operable in response to the time constant of the timing circuit and the signal level of the control circuit, both of which are determined by the variable resistance.

2. A circuit responsive to the initiation of a pulse for providing a precise control of the duration of the pulse, the circuit including in combination a normally nonconducting device and a differentiating circuit responsive to the initiation of pulses and coupled to the input circuit of the normally nonconducting device, the differentiating circuit including means arranged to bias the device to nonconduction, the bias level being cumulatively related to the time constant of the differentiating circuit, whereby the normally nonconducting device conducts only for a precisely established time following the initiation of a pulse.

3. A circuit for precisely controlling the width of output pulses from a multivibrator having an input circuit and an output circuit from which output pulses are to be derived, the circuit operating to provide a wide range of pulse widths and including in combination a source of potential, a variable resistance element coupled to the source of potential, means coupled to the variable resistance element for providing therewith a differentiating circuit responsive to the output pulses from the multivibrator, and signal isolating means coupled to the variable resistance element for operating in response to signals from the differentiating circuit, the signal resistance element and the source of potential and being coupled to provide signals to the input circuit of the multivibrator.

4. A circuit for controlling the width of output pulses from a monostable multivibrator and including the combination of a differentiating circuit which includes a variable resistor responsive to the output pulses, an electron device responsive to the differentiating circuit and coupled to control the potential level of the input circuit of the multivibrator, means, including the variable resistor, coupled to bias the electron device at a controllably variable level, and means coupled to the input circuit of the multivibrator for controlling the potential level of the input circuit substantially independently of the operation of the electron device.

5. A circuit for controlling the width of output pulses from a multivibrator circuit which can be controlled at its input circuit to be maintained in a triggered state by input signal levels in excess of a predetermined amplitude, the timing circuit including in combination a transistor device coupled to the input circuit of the multivibrator circuit, a reverse bias circuit coupled to the transistor device, the reverse bias circuit including a variable resistance circuit coupled to render the transistor device normally nonconducting, and a capacitance device coupling the output circuit of the multivibrator to the variable resistance circuit and the transistor device and providing with the variable resistance circuit a differentiating circuit for rendering the transistor device conductive in response to the leading edge of output pulses from the multivibrator, the setting of the variable resistance circuit determining both the reverse bias level of the transistor device and the decay time constant of the differentiated signal, and acting to vary the time during which the transistor device is conductive, the transistor device when nonconductive maintaining the input circuit at a potential below the predetermined amplitude.

6. A timing circuit for controlling the width of the output pulses provided at an output terminal during the triggered state of a monostable multivibrator, the monostable multivibrator having an input terminal at which potential levels in excess of a predetermined amplitude may be applied to maintain the multivibrator in the triggered state, the timing circuit including in combination a voltage source, an emitter follower transistor, the emitter of the transistor being coupled to the input terminal of the multivibrator, a variable resistor coupled at one of its terminals to the base of the emitter follower transistor at a circuit junction point and coupled at its opposite terminal to the voltage source, the variable resistor providing a selected level of reverse bias of the emitter follower transistor which maintains the emitter follower transistor nonconducting, and means including a capacitor coupling the output terminal of the multivibrator to the circuit junction point and forming with the variable resistor a differentiating circuit for providing differentiated signals from the output pulses, the differentiated signals from the leading edge of the output pulses having a decay characteristic determined by the value of the variable resistor, the arrangement being such that the sharper the rate of decay of the differentiated signal the higher the reverse bias of the emitter follower transistor, so that the period of conduction of the emitter follower transistor is widely varied for relatively small changes in the setting of the variable resistor, the emitter follower transistor when conducting maintaining the potential level of the input terminal in excess of the predetermined level.

7. A multivibrator circuit for providing output pulses of selectively variable widths, including the combination of a pair of cross-connected electron devices coupled to be maintained in differing conductivity states which may be reversed by trigger signals applied to an imput terminal, selected potential levels of the input terminal maintaining the electron devices in particular conductivity states, a control feedback circuit responsive to the leading edges of the output pulses and coupled to the input terminal for thereafter maintaining the input terminal at a selected potential level for a controlled period, and means coupled to the control feedback circuit for terminating the selected potential level at a time determined by a synchronizing pulse.

8. A multivibrator circuit for providing pulse outputs of controllably variable duration and including in combination at least a pair of cross-connected multivibrator elements including an input terminal and an output terminal, with potential levels above a selected amplitude at the input terminal maintaining the multivibrator in a selected state, and a control feedback loop coupling the output terminal to the input terminal, the control feedback loop including a signal differentiating circuit which includes a variable resistor and a signal isolating circuit having a reverse bias arrangement which includes in part the variable resistor, so that signals in excess of the predetermined amplitude are provided to the input terminal of the multivibrator in response to multivibrator output signals for a duration which is controlled both by the characteristics of the differentiating circuit and by the amplitude of the reverse bias, the two factors being additively combined to have a cumulative effect upon change of the output pulse width.

9. A monostable multivibrator circuit including in combination first and second multivibrator transistors, an input circuit coupled to the first of the transistors, an output circuit coupled to the second of the transistors, a cross-coupling circuit connected between the first and second transistors, said first transistor being in a normally conducting state which is terminated by the application of an input pulse, said second transistor being in a normally non-conducting state which is normally terminated upon the application of an input pulse, and a timing control feedback circuit coupled between the output circuit and the input circuit and including a potential source, a differentiating circuit having an intermediate junction point and including a capacitor coupled to the output circuit and a variable resistor coupled to the potential source, and an emitter follower transistor having its base coupled to the junction point and its emitter coupled to the input circuit, the emitter follower transistor being reverse biased by the potential source at a level which is determined by the setting of the variable resistor and the variable resistor also determining the decay characteristic of the differentiated signal applied to the base of the emitter follower transistor, so that the time period during which the reverse bias is overcome and the emitter follower transistor conducts so as to maintain the multivibrator in the condition in which it provides an output pulse is dependent both upon the decay characteristics of the differentiated signal and the level of the reverse bias.

10. A transistor monostable multivibrator including in combination a first normally conducting transistor device, a second normally nonconducting transistor device, a resistor-capacitor coupling circuit connecting the first transistor device to the second transistor device, an input circuit coupled to the first transistor device, means applying input signals to the input circuit to terminate conduction in the first transistor device and to initiate conduction of the second transistor device, an output circuit coupled to the second transistor device, biasing means coupled to the input circuit and to the first transistor device for maintaining conduction therein, an emitter follower transistor having an emitter coupled to the biasing means, a source of positive potential coupled to the collector of the emitter follower transistor, a source of negative potential, a variable resistor coupling the source of negative potential to the base of the emitter follower transistor at a circuit junction point which reverse biases the emitter follower transistor at a level determined by the value of the variable resistor, and a capacitor coupling the output circuit to the circuit junction point and forming a differentiating circuit with the variable resistor, whereby the differentiating circuit responds to the leading edges of the output pulses to provide differentiated pulses to the base of the emitter follower transistor to control the input circuit for time periods which are dependent upon the value of the variable resistor, so as to maintain a condition in which the first multivibrator transistor is nonconducting and the second multivibrator transistor is conducting for a predetermined period.

11. A monostable multivibrator circuit providing output pulses which are initiated by the application of input pulses and terminated at a precisely controlled variable time subsequent to the application of the input pulse or alternatively terminated by the application of an external synchronizing signal, the multivibrator circuit comprising in combination a pair of multivibrator elements, a first of which has an input circuit responsive to the input signals and which is normally conducting except upon the presence of a voltage level in excess of a predetermined amplitude at the input circuit, a second multivibrator element coupled to the first and arranged to be normally nonconducting, the second multivibrator element including an output terminal, and a control feedback circuit coupled to the second multivibrator element and to the input circuit of the first multivibrator element and including a transistor device having an output terminal coupled to the input circuit of the first multivibrator element, a reverse bias circuit including a variable resistor coupled to maintain the transistor device normally nonconducting, and a capacitor coupled in the circuit path between the output terminal of the second multivibrator element and the variable resistor and providing with the variable resistor a differentiating circuit which operates to render the transistor device conductive for a period of time determined by the value of the capacitor and the setting of the variable resistor, so as to establish a voltage level in excess of the predetermined amplitude at the input circuit, and means coupled to the input circuit and the control feedback circuit for providing a synchronizing pulse to render the first multivibrator element conducting and terminate the output pulse by reducing the voltage level of the input circuit below the predetermined amplitude.

12. A transistor multivibrator for providing output pulses of controlled duration which may be terminated by the application of synchronizing pulses at variable intervals following the application of an input pulse, the multivibrator including in combination first and second multivibrator transistors, each having a collector, emitter and a base, the base of the first multivibrator transistor being coupled to receive the input signals, the first multivibrator transistor being biased to have a first conductive state and the second multivibrator transistor being biased to have a second conductive state differing from the first conductive state, first and second emitter follower transistors, each having an emitter, collector and a base, the base of each of the first and second emitter follower transistors being coupled to the collector of the first and second multivibrator transistors, respectively, a resistor-capacitor combination coupling the emitter of the first emitter follower transistor to the base of the second multivibrator transistor to provide a cross-connection between the multivibrator transistor, so that when the first multivibrator transistor is established in the second conductive state the second multivibrator transistor is established in the first conductive state, an output circuit coupled to the emitter of the second emitter follower transistor, a third normally conducting emitter follower transistor having an emitter coupled to the input circuit, a source of negative potential, means including an adjustable resistor coupling the source of negative potential to the base of the third emitter follower transistor at a junction point, thereby to bias the third emitter follower transistor to be normally nonconducting, the capacitor coupling an output circuit of the multivibrator to the junction point and forming with the variable resistor a differentiating circuit which applies differentiated signals to the base of the third emitter follower transistor for periods determined by the reverse bias applied and the time constant of the differentiating circuit, and means for terminating the output pulses of the multivibrator, the means for terminating the output pulses being coupled to the junction point and being responsive to the synchronizing pulses for controlling the voltage level of the base of the first multivibrator transistor.

References Cited by the Examiner

UNITED STATES PATENTS

| | | | |
|---|---|---|---|
| 2,721,937 | 10/55 | Braga | 328—200 |
| 2,842,666 | 7/58 | Woodcock et al. | 328—207 |
| 2,941,096 | 6/60 | Gunkel | 307—88.5 |
| 2,987,632 | 6/61 | Milford | 307—88.5 |

JOHN W. HUCKERT, *Primary Examiner.*

HERMAN KARL SAALBACH, GEORGE N. WESTBY, ARTHUR GAUSS, *Examiners.*

UNITED STATES PATENT OFFICE

CERTIFICATE OF CORRECTION

Patent No. 3,214,602 October 26, 1965

Joan M. Heyning et al.

It is hereby certified that error appears in the above numbered patent requiring correction and that the said Letters Patent should read as corrected below.

Column 2, lines 41 and 42, for "resisor" read -- resistor --; column 6, line 59, for "and is shunted by a resistor 80," read -- shunted by a resistor 80. --; line 75, for "duration" read -- durations --; column 11, line 21, for "transistor" read -- transistors --.

Signed and sealed this 12th day of July 1966.

(SEAL)
Attest:

ERNEST W. SWIDER
Attesting Officer

EDWARD J. BRENNER
Commissioner of Patents